US011538107B1

(12) United States Patent
Trayers et al.

(10) Patent No.: US 11,538,107 B1
(45) Date of Patent: Dec. 27, 2022

(54) RATE AND PAYMENT GUIDE

(71) Applicant: Wells Fargo Bank, N.A., San Francisco, CA (US)

(72) Inventors: Christina A. Trayers, San Francisco, CA (US); Stuart Rehfuss, Mooresville, NC (US); Julie A. Lane, Hamilton, NJ (US); Sue Murphy, West Des Moines, IA (US); Rodney E. O'Neal, Oakland, CA (US); Ashwin Pinto, Tracy, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 58 days.

(21) Appl. No.: 17/248,901

(22) Filed: Feb. 12, 2021

Related U.S. Application Data

(63) Continuation of application No. 16/429,612, filed on Jun. 3, 2019, now Pat. No. 10,949,921, which is a continuation of application No. 15/255,501, filed on Sep. 2, 2016, now Pat. No. 10,311,512.

(51) Int. Cl.
*G06Q 40/02* (2012.01)
*G06Q 40/00* (2012.01)

(52) U.S. Cl.
CPC ........... *G06Q 40/025* (2013.01); *G06Q 40/00* (2013.01); *G06Q 40/02* (2013.01)

(58) Field of Classification Search
None
See application file for complete search history.

(56) References Cited

U.S. PATENT DOCUMENTS

| 5,742,775 | A | 4/1998 | King |
| 5,930,775 | A | 7/1999 | McCauley et al. |
| 7,089,202 | B1 | 8/2006 | McNamar et al. |
| 7,089,503 | B1 * | 8/2006 | Bloomquist ........... G06Q 40/00 705/38 |
| 7,542,921 | B1 | 6/2009 | Hildreth |
| 7,548,884 | B1 | 6/2009 | Thomas |
| 7,630,932 | B2 | 12/2009 | Danaher et al. |
| 7,640,209 | B1 | 12/2009 | Brooks et al. |
| 7,647,272 | B1 | 1/2010 | Muren |
| 7,742,966 | B2 | 6/2010 | Erlanger |
| 7,805,364 | B2 | 9/2010 | Stipek et al. |
| 7,818,254 | B1 | 10/2010 | Ma |
| 7,870,048 | B2 | 1/2011 | Bhagwat |
| 7,899,731 | B2 | 3/2011 | Sreevijayan et al. |
| 7,953,659 | B2 | 5/2011 | Stipek et al. |
| 7,970,699 | B1 | 6/2011 | Bramlage et al. |
| 7,974,895 | B1 | 7/2011 | Allen et al. |
| 8,229,846 | B1 | 7/2012 | Sheehy et al. |
| 8,321,335 | B1 | 11/2012 | Bramlage |
| 8,341,052 | B2 | 12/2012 | Combs |
| 8,341,073 | B1 | 12/2012 | Bramlage |

(Continued)

*Primary Examiner* — Joseph W. King
(74) *Attorney, Agent, or Firm* — Merchant & Gould P.C.

(57) ABSTRACT

A system for generating rate and payment information for a customer receives an inquiry type from a customer relating to a loan or mortgage. The system also receives a value specific to the potential loan or mortgage. In combination with a product and policy database and a pricing/fee database, relevant financial products are determined and provided to the customer. The inquiry type can include buying a property, refinancing a mortgage, improving a property, and/or using funds from a property.

20 Claims, 18 Drawing Sheets

(56) References Cited

U.S. PATENT DOCUMENTS

| | | |
|---|---|---|
| 8,392,327 B2 | 3/2013 | Sheehy et al. |
| 8,423,469 B2 | 4/2013 | Marlow et al. |
| 8,433,650 B1 | 4/2013 | Thomas |
| 8,442,906 B1 | 5/2013 | Thomas |
| 8,626,644 B2 | 1/2014 | Greig et al. |
| 8,666,881 B2 | 3/2014 | Lem |
| 8,666,885 B1 | 3/2014 | Bramlage |
| 8,725,627 B2 | 5/2014 | Stipek |
| 8,793,183 B2 | 7/2014 | Bramlage |
| 8,799,155 B2 | 8/2014 | Sheehy et al. |
| 2006/0224502 A1 | 10/2006 | McGowan |
| 2008/0319895 A1 | 12/2008 | Lazerson |
| 2010/0078476 A1* | 4/2010 | Ben-Zvi ............... G06Q 20/349 235/380 |
| 2013/0311355 A1 | 11/2013 | Chirehdast |
| 2014/0122322 A1 | 5/2014 | Greig et al. |
| 2014/0207655 A1 | 7/2014 | Stipek et al. |
| 2015/0081590 A1 | 3/2015 | Avrick |
| 2016/0232546 A1* | 8/2016 | Ranft .................. G06Q 40/025 |

* cited by examiner

Mortgage Rate and Payment Calculator

Calculate rates and payments for purchase, refinance, and home equity.

Home Lending Rate & Payment Calculator

| | | |
|---|---|---|
| Loan Purpose | Purchase ▼ | |
| Home Value | $ | ←406 |
| Down Payment | $ | |
| Loan Amount | $ | |
| Property Location | State ▼   County ▼ | ←408 |

Find the Right Loan for You          [ Calculate ]

FIG. 5

To buy your next home

Home information

Price of the home       ⟵ 406

$ | 10,000 - 20,000,000 |

Your down payment

$ | 1 - 20,000,000 | or | 0 - 100 | %

Annual homeowners insurance (optional) ⓘ

$ | 0 - 10,000,000 |

Anticipated annual real estate taxes (optional) ⓘ

$ | 0 - 10,000,000 | or | 0 - 100 | %

⟵ 408

Property location

| Select state ▼ |   | Select county ▼ |

FIG. 6

To pay off your mortgage sooner

+ Prefill ~410
Save time by using your Wells Fargo username and password to prefill forms.

Home information ~406

Value of the home (?)        Existing mortgage balance (?)

$ |10,000 - 20,000,000|        $ |0 - 10,000,000|

Total current monthly payment (?)        Current interest rate (?)

$ |0 - 100,000|        |0.000 - 20.000| %

Annual homeowners insurance (optional) (?)

$ |0 - 10,000,000|

Anticipated annual real estate taxes (optional) (?)

$ |0 - 10,000,000|  or |0 - 100| %

Property location ~408

|Select state ▼|   |Select county ▼|

FIG. 7

To renovate or remodel your home

+ Prefill ~410
Save time by using your Wells Fargo username and password to prefill forms.

Home information ～406
Additional funding you are requesting ⓘ
$ | 1 - 6,000,000 |

Value of the home ⓘ       Existing mortgage balance ⓘ
$ | 10,000 - 20,000,000 |    $ | 0 - 10,000,000 |

Total current monthly payment ⓘ       Current interest rate ⓘ
$ | 0 - 100,000 |    | 0.000 - 20.000 | %

Annual homeowners insurance (optional) ⓘ
$ | 0 - 10,000,000 |

Anticipated annual real estate taxes (optional) ⓘ
$ | 0 - 10,000,000 |   or | 0 - 100 | %

Property location ～408

Select state ▼    Select county ▼

Select an account
The following mortgage or home equity line of credit accounts are associated with your username. Please select the loan to use for this reference application.

☐ Mortgage xxxxxxxxx5499

| Balance | Payment | Interest |
|---------|---------|----------|
| $77,000 | $533 | 2.5% |

Cancel  Prefill

Prefill  Edit
You have currently selected Mortgage XXXXXXXXX5499

Home Information

Value of the home ⓘ
$ 10,000 - 20,000,000

Existing mortgage balance ⓘ
$ 77,000

Total current monthly payment ⓘ
$ 533

Current interest rate ⓘ
2.500 %

Annual homeowners insurance (optional) ⓘ

| Today's Mortgage Rates and Refinance Rates | | |
|---|---|---|
| Purchase Rates Refinance Rates | | |
| Product | Interest Rate | APR |
| Conforming and Government Loans | | |
| 30-Year Fixed Rate | 3.750% | 3.774% |
| 30-Year Fixed-Rate FHA | 3.625% | 4.670% |
| 30-Year Fixed-Rate VA | 3.250% | 3.535% |
| 15-Year Fixed Rate | 3.000% | 3.069% |
| 7/1 ARM | 3.125% | 3.384% |
| 5/1 ARM | 3.000% | 3.363% |
| 5/1 ARM VA | 2.875% | 2.743% |
| Jumbo Loans- Amounts that exceed conforming loan limits | | |
| 30-Year Fixed-Rate Jumbo | 3.375% | 3.391% |
| 15-Year Fixed-Rate Jumbo | 3.250% | 3.278% |
| 7/1 ARM Jumbo | 2.750% | 3.170% |

| Loan Type | Interest Rate | APR | Payment |
|---|---|---|---|
| 30-Year Fixed Rate with BPMI Conforming loan with predictable payments. Borrower paid mortgage insurance. View Details > | 3.625% | 3.727% | $1,182.00 |
| 30-Year Fixed-Rate FHA Government loan with predictable payments. View Details > | 3.750% | 4.462% | $1,343.00 |
| 30-Year Fixed-Rate VA Government loan with predictable payments. Financing for qualified servicemembers, veterans and eligible family members. View Details > | 3.375% | 3.482% | $1,119.00 |
| 15-Year Fixed Rate with BPMI Shorter term conforming loan with predictable payments. Borrower paid mortgage insurance. View Details > | 2.875% | 3.033% | $1,749.00 |
| 5/1 ARM with BPMI Adjustable rate conforming loan; fixed payments first 5 years and then adjusts annually. Borrower paid mortgage insurance. View Details > | 2.875% | 3.406% | $1,079.00 |
| 5/1 ARM FHA Adjustable rate government loan; fixed payments first 5 years and then adjusts annually. View Details > | 3.625% | 3.492% | $1,325.00 |
| 5/1 ARM VA Adjustable rate government loan; fixed payments first 5 years and then adjusts annually. Financing for qualified servicemembers, veterans and eligible family members. | 2.875% | 2.578% | $1,050.00 |

| 30-Year Fixed Rate with BPMI Details  Conforming loan with predictable payments. Borrower paid mortgage insurance. ||
|---|---|
| Loan Basics | Results |
| Monthly Principal & Interest Payment  Excludes taxes and hazard insurance. Total payment will be higher. | $1,182.00 |
| Loan Amount | $250,000 |
| Interest Rate | 3.625% |
| APR | 3.727% |
| Discount Points | 0.000% |
| Lock-in Period | 60 days |
| Payment Term | 30 years |
| Down Payment | 16.70% |
| Closing Costs | $5,058.00 |
| Upfront Mortgage Insurance Premium | $0.00 |
| Monthly Mortgage Insurance Premium (included in monthly P&I payment). | $42.00 |

30-Year Fixed Rate with BPMI      Compare ☐
One loan with predictable payments.

| | Rate | APR | Term | Payment | Loan amount | Points | Closing costs | |
|---|---|---|---|---|---|---|---|---|
| 30-year | 3.625% | 3.688% | 30 years | $1,182 | $250,000 | 0.0 | $2,653 | > |

5/1 ARM with BPMI      Compare ☐
One loan with fixed payments for first 5 years, then adjusts annually.

| | Rate | APR | Term | Payment | Loan amount | Points | Closing costs | |
|---|---|---|---|---|---|---|---|---|
| 5/1 ARM | 3.0% (1st 5 Years) | 3.403% | 30 years | $1,096 | $250,000 (1st 5 Years) | 0.0 | $3,839 | > |

7/1 ARM with BPMI      Compare ☐
One loan with fixed payments for first 7 years, then adjusts annually.

| | Rate | APR | Term | Payment | Loan amount | Points | Closing costs | |
|---|---|---|---|---|---|---|---|---|
| 7/1 ARM | 3.125% (1st 7 Years) | 3.415% | 30 years | $1,113 | $250,000 (1st 7 Years) | 0.0 | $4,165 | > |

30-Year Fixed Rate with LPMI      Compare ☐
One loan with predictable payments.

| | Rate | APR | Term | Payment | Loan amount | Points | Closing costs | |
|---|---|---|---|---|---|---|---|---|
| 30-year | 3.75% | 3.763% | 30 years | $1,158 | $250,000 | 0.0 | $3,291 | > |

Low Initial Principal & Interest Payment      Compare ☐

5/1 ARM with LPMI
One loan with fixed payments for first 5 years, then adjusts annually.

| | Rate | APR | Term | Payment | Loan amount | Points | Closing costs | |
|---|---|---|---|---|---|---|---|---|
| 5/1 ARM | 3.25% (1st 5) | 3.455% | 30 years | $1,088 | $250,000 (1st 5 Years) | 0.0 | $4,178 | > |

30-Year Fixed Rate      Compare ☐
paired with a Line of Credit with a partially amortizing 1-Year Fixed-Rate Advance (FRA)
Combination that provides greater payment flexibility. 1 year fixed payment partially repays advance. After 1 year, the unpaid balance rolls into your line at the variable rate in effect at that time and will require a minimum $100 monthly payment.

| | Rate | APR | Term | Payment | Loan amount | Points | Closing costs | |
|---|---|---|---|---|---|---|---|---|
| 30-year | 3.875% | 3.9% | 30 years | $1,129 | $240,000 | 0.0 | $3,574 | > |
| FRA | 3.615% (Fixed Rate) | 3.615% | 1 year | $46 | $10,000 | 0.0 | $0 | |

Settlement & Closing Costs | Benefits & Considerations

Estimated settlement/closing costs Estimated monthly payment

Estimated prepaid expenses Estimated monthly payment

| | | | |
|---|---|---|---|
| Interest | $372 | Mortgage principal and interest payment | $1,140 |
| Lender fees | | Mortgage insurance | $42 |
| Our Origination Charge | $890 | Estimated total monthly payment | $1,182 |
| Credit for Interest Rate Chosen | ($1,250) | Closing details | |
| State and local statutory fees | | Estimated loan amount | |
| State Tax/Stamps-Mtg/DOT | $600 | Purchase price | $300,000 |
| Record Deed | $46 | Down payment | ($50,000) |
| Record Mortgage / DOT | $46 | Estimated total loan amount | $250,000 |
| Third party fees | | Estimated cash paid or received at closing | |
| Tri Merge Credit Report | $22 | | |
| Tax Service | $80 | Down payment | $50,000 |
| Title-Survey | $200 | Estimated total settlement/closing costs | $2,966 |
| Title Ins-Lenders Coverage | $750 | | |
| Title - Name Search | $40 | You pay at closing | $52,966 |
| Appraisal | $455 | | |
| Conservation Fee | $5 | | |
| Title - Closing/Escrow | $325 | | |
| Title - Courier | $50 | | |
| Abstract or Title Search | $210 | | |
| Title - Exam/Attys Opinion | $125 | | |
| Estimated total settlement costs | $2,966 | | |

FIG. 15C

RATE AND PAYMENT GUIDE

INTRODUCTION

Large financial transactions, such as home and automobile purchases, can be complex and confusing for the average consumer. The information needed to make intelligent financial decisions cannot easily be obtained in a single place. For example, information relating to the financial products available, qualification requirements, fees and restrictions, and other relevant information, is not always readily acquired.

Further, when such information is found, it can still be complicated to select the relevant financial product or products for a particular transaction. For example, it can be difficult to determine how the structure of a given transaction (e.g., loan amount, term, etc.) impacts the costs to the consumer. This makes borrowing decisions more complex; typical consumers might make decisions without considering complete information.

SUMMARY

Examples and embodiments described herein relate to systems and methods for assisting customers in the selection of financial products. In one aspect, a system including a processing unit and system memory is configured to receive an inquiry type from a customer, the inquiry type selected from: buy a property and refinance a mortgage, receive a value, the value being at least one of: a property value and a loan amount, receive a location including a state, receive a credit score, determine financial products available to the customer using the inquiry type, the value, the location, and the credit score, and provide the plurality of financial products to the customer. The financial products reflect current pricing information from a pricing database.

In another aspect, a product identification system includes a products database, a pricing database, a computing device including a processing unit configured to communicate with the products database and the pricing database, and computer readable medium encoding instructions that, when executed by the processing unit, cause the processing unit to: receive criteria from a customer, identify a plurality of financial products stored in the products database, the plurality of financial products being identified for the customer based on the criteria, provide current pricing information from the pricing database related to the identified financial products, and report the identified financial products that meet the criteria to the customer. The criteria can include an inquiry type selected from: buy a property, refinance a mortgage, improve a property and use funds from a property, a value, the value being at least one of: a property value and an amount of money requested, a location including a state and a county, and a credit score.

In another aspect, a computer-implemented method for selecting one or more financial products includes receiving an inquiry type from a customer, receiving a value, the value being at least one of: a property value and an amount of money requested, receiving a location including a state and a county, receiving a credit score, determining a plurality of financial products available to the customer using the inquiry type, the value, the location, and the credit score, and providing the plurality of financial products to the customer. The inquiry type can be selected from buy a property, including buy a first home, buy a next home, buy a vacation home, relocate, and buy investment property; refinance a mortgage, including pay off a mortgage sooner, reduce a current interest rate, lower a monthly payment, and convert to a fixed rate; improve a property, including repair a property and renovate a property; and use funds from a property, including finance a major purchase and finance everyday purchases. The financial products reflect current pricing information from a pricing database.

The details of one or more embodiments are set forth in the accompanying drawings and the description below. Other features, objects, and advantages of these embodiments will be apparent from the description, drawings, and claims.

DESCRIPTION OF THE DRAWINGS

The following drawing figures, which form a part of this application, are illustrative of described technology and are not meant to limit the scope of the disclosure in any manner.

FIG. 5 shows an example interface provided during the method of FIG. 3.

FIG. 6 shows an example interface provided during the method of FIG. 3.

FIG. 7 shows an example interface provided during the method of FIG. 3.

FIG. 8 shows an example interface provided during the method of FIG. 3.

FIG. 11 shows another example interface shown during receiving customer input identified in FIG. 9.

FIG. 12 shows another example interface shown during receiving customer input identified in FIG. 9.

FIG. 13 shows an example interface providing products during the method of FIG. 3.

FIG. 14A shows an example interface providing products during the method of FIG. 3.

FIG. 14B shows an example detailed view of one of the products shown in FIG. 14A.

FIG. 15A shows an example interface providing products during the method of FIG. 3.

FIGS. 15B-15C show an example detailed view of one of the products shown in FIG. 15A.

DETAILED DESCRIPTION

Figure 1:
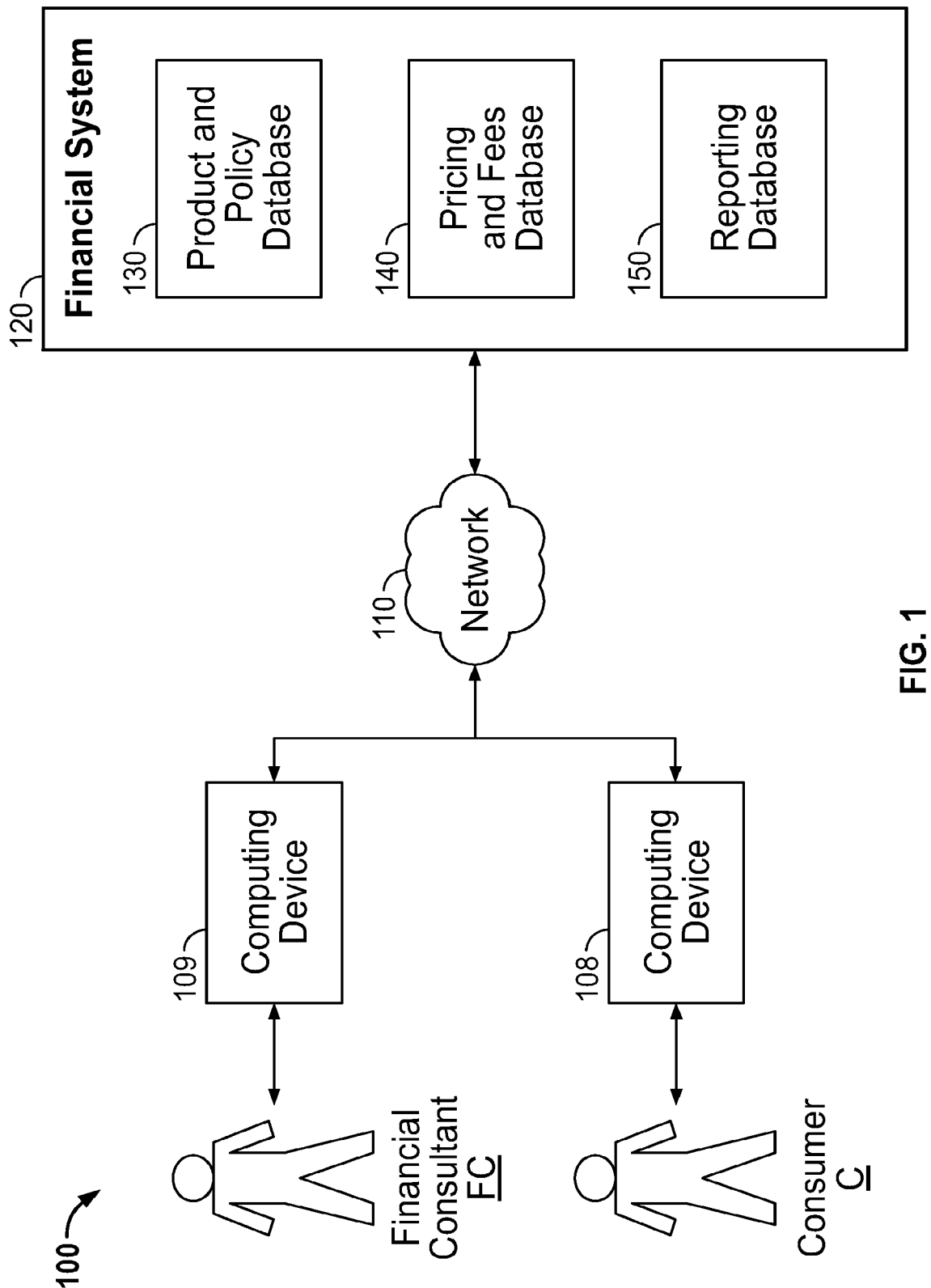
FIG. 1 shows an example financial system environment.

Various embodiments of the present invention will be described in detail with reference to the drawings, wherein like reference numerals represent like parts and assemblies throughout the several views. Additionally, any examples set forth in this specification are not intended to be limiting and merely set forth some of the many possible embodiments.

The examples described herein are related to systems and methods for assisting customers in the selection of financial products. In some examples, these financial products are loans, such as loans or lines of credit (e.g., home mortgages or home improvement loans). The systems and methods described herein assist financial consultants and customers in the selection of the financial products.

FIG. 1 illustrates a schematic diagram of an example rate and payment guide system 100. The system 100 includes a computing device 108 communicating with a financial system 120 that is programmed to facilitate the various business processes of a typical financial institution. In this example, the financial system 120 is programmed to facilitate the selection of financial products, such as loans. Computing devices 108, 109 can communicate with financial system 120 via network 110. Other embodiments can include more or fewer components.

The financial system 120 is connected to various sources of information to assist the financial system 120 in identifying possibly relevant available financial products, including a product and policy database 130, a pricing and fees database 140, and a reporting database 150.

The product and policy database 130 includes information about various financial products that are available for customers. In this example, the product and policy database 130 includes information related to different types of loan products that are available. Examples of these types of loans include, without limitation, fixed-term loans (e.g., 30-year and 15-year), adjustable-rate mortgages (ARMs), and home equity loans. This information can include the types of available loans, qualifications required for the loans, etc.

The product and policy database 130 also stores current policy information about the financial products. In this example, the types of polices supported are subsets of investor credit policy, internal company credit policy, and real-time pricing information used together to find relevant limits. Some examples of specific policies include setting internal product level loan-to-value/combined loan-to-value (LTV/CLTV) limits designated by market classification, setting county driven loan limits, and Home Affordable Refinance Program (HARP) program eligibility.

The pricing and fees database 140 includes up-to-date information relating to the pricing and fees associated with each of the products in the product and policy database 130. For example, the pricing and fees database 140 includes such information as interest rates for each of the loans, as well as information related to fees associated with the loans, such as origination and title fees, etc.

The reporting database 150 stores information that allows the financial system 120 to report information to users of the financial system 120. Examples of such information include reports associated with the financial products presented, such as a report listing the applicable loan products for a particular customer. The reporting database 150 can be accessed to retrieve the information that is sent to the financial consultant and customer.

In this example, various individuals can access the financial system 120 to obtain information about the financial products. These individuals include both a customer C and a financial consultant FC that assists the customer C in the selection of financial products. The customer C and the financial consultant FC use computing devices 108 and 109, respectively, to access financial product information from the financial system 120.

In one example, the customer C directly accesses the financial system 120 when the customer C is searching for a financial product, such as a mortgage. In this scenario, the customer C accesses the financial system 120 to obtain information related to mortgage options available to purchase a home. The financial system 120 assists the customer C in determining which options are available given the customer's specific financial situation. As described further below, the financial system 120 provides information related to specific loan options for which the customer potentially qualifies.

In other instances, customer C interacts with financial consultant FC and then accesses financial system 120. Customer C inputs financial information and indicates one or more objectives into financial system 120. Then customer C can elect to have that information sent to financial consultant FC. Alternatively, when customer C requests additional help, financial system 120 automatically provides the information and objectives to financial consultant FC.

In other examples, a financial consultant FC accesses the financial system 120 to assist customers in the selection of financial products. In this scenario, the financial consultant FC provides information on the customer's behalf. The resulting identified financial products from the financial system 120 are returned to the financial consultant FC. The financial consultant FC can then share these options with the customer C.

In these examples, the financial system 120 is one or more computing devices, each including a processing unit and computer readable media. Additional details regarding the computing components of financial system 120 are shown and discussed with reference to FIG. 18, below.

In example embodiments, the financial system 120 can communicate with other computing devices (e.g., the databases 130, 140, 150 and the computing devices 108, 109 used by the customer C and the financial consultant FC) through one or more networks 110, such as a local area network (LAN), a wide area network (WAN), the Internet, or a combination thereof. Communications can be implemented using wired and/or wireless technologies. In example embodiments, the financial system 120 includes one or more web servers that host one or more web sites that are accessible from the network(s).

For example, in some embodiments, the customer C and/or the financial consultant FC use a browser running on computing device 108 or 109 to access information from the financial system 120. The customer C and the financial consultant FC can provide and obtain information from the financial system 120, and the system 120 can display information about financial products for review.

The network 110 can include any type of wireless network, wired network, or any communication network known in the art. For example, wireless connections can include cellular network connections and connections made using protocols such as 802.11a, b, and/or g.

Figure 2:
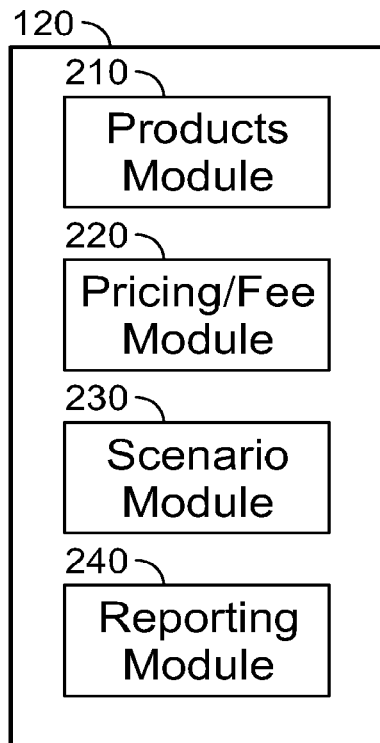
FIG. 2 shows example components of a financial system of FIG. 1.

FIG. 2 shows logical components of the financial system 120. In this example, the financial system 120 includes a products and policies module 210, a pricing/fee module 220, a scenario module 230, and a reporting module 240. Other embodiments can include more or fewer modules.

The financial system 120 is programmed to execute the modules 210, 220, 230, 240 according to firmware and/or software accessible to the financial system 120. For example, the processing unit of the financial system 120 executes software stored on computer readable media to implement the modules 210, 220, 230, 240.

The products and policies module 210 accesses information in the product and policy database 130 to provide the customer and/or the financial consultant with information about the financial products that are available. For example, the products and policies module 210 can accept such information as desired loan amount, duration, and qualification information.

The products and policies module 210 returns, in response to this information, one or more financial products that meet the requirements of the request. For example, if a home lending product is desired, the products and policies module 210 uses information from the customer, like desired loan amount, duration, property type and location, credit score, veteran status, and loan-to-value ("LTV") ratio, to identify mortgages that are available to the customer. Additionally, the products and policies module can evaluate more than one type of loan, such as a mortgage and a home equity loan, and return a combination of financial products that meet the requirements of the request.

The pricing/fee module 220 accesses information in the pricing and fees database 140 to provide up-to-date pricing information for the financial products identified by the products and policies module 210. For example, the pricing/fee module 220 provides such information as interest rate and estimated APR for each mortgage option identified by the products and policies module 210. Other information, such as lender and third-party fees, is also provided. Fees can include origination fees for the financial system 120, as well as other fees, such as fees paid to third parties like title and insurance companies.

The pricing/fee module 220 also accesses prices and fees specific to a state and/or county. For example, interest rates may vary depending upon the location of the loan. Additionally, fees or costs may vary depending upon the location of the loan.

The scenario module 230 uses information from the products and policies module 210 and the pricing/fee module 220 to review the financial products that are delivered to the customer. For example, the scenario module 230 can rank the mortgage options that are available to the customer based on given criteria. Such criteria can include, for example, the interest rate, the fees, the estimated monthly payment, etc. Using one or more of these criteria, the scenario module 230 selects the relevant available home lending products to be delivered to the customer.

The reporting module 240 collates all of the information from the modules 210, 220, 230 and generates a report for consumption by the customer C and/or the financial consultant FC. The report can be displayed upon a computing device (e.g., in a browser window and/or on a word processing application) and/or can be printed in a hard copy format for later review. Optionally, the customer and/or the financial consultant can transmit the report via email. In this example, the report includes all of the relevant information about the available mortgages, including such information as loan amount, rate, fees, costs, and estimated monthly payment.

In some examples, the system can also guarantee that the information (e.g., interest rates, fees, etc.) provided for the products returned to the customer is accurate. This is possible using the pricing and fees database 140, which provides up-to-date information regarding pricing, interest rates, fees, etc. This allows the customer to have confidence in the quoted products and to make decisions without worrying about changes once a product is selected.

In yet other examples, other types of financial products can be explored. For example, the system can integrate information relating to refinance programs, such as government refinance programs like HARP and FHA programs. When a customer requests information about financial products, the system can review the refinance programs and identify any that are applicable.

The system 120 is programmed to review different types of loan options to provide creative solutions for customers. This can involve, for example, providing financial options for a home that include both a mortgage and other funding source, such as a line of credit. In this manner, the system 120 provides an optimal solution for the customer beyond simply varying a loan amount or duration.

Further, the system 120 can provide other types of financial products, such as debt consolidation products. The system 120 can collect information about other significant debts from the customer, such as automobile and educational loans, and factor those into the financial products that are identified for the customer. For example, the system 120 can consolidate these loans into a single mortgage for the customer.

Further, the system 120 can provide different types of loans. Beyond the example mortgages described above, the system 120 can also provide financial products related to automobiles, personal loans, lines of credit, etc. The system 120 can build product packages of multiple types of loans that are presented to the customer. For example, if the customer needs to refinance a mortgage and also purchase a new automobile, the system 120 can provide packages of financial products that include both home lending products and automobile loans, broken down into packages that meet pricing and policy considerations.

In some examples, the customer and/or the financial consultant can access the system 120 using a variety of computing devices. In this example, the system 120 is implemented as a web service, allowing multiple access points and data pulls.

For example, as noted above, the customer C can access the system 120 using the computing device 108, such as a laptop or desktop computer. In other examples, the customer can access the system 120 using a mobile computing device, such as a smartphone (e.g., an iPhone, Windows Phone, Blackberry, Android Phone) or tablet computing device (e.g., a Windows-based tablet or iPad). In these examples, the mobile computing device can access similar or the same functionality as that described above for the system 120.

For example, in one scenario, the system 120 can be accessed using a client application running on the mobile computing device, such as a dedicated application or mobile browser. Since the mobile computing device is location-aware (i.e., includes Global Positioning System ("GPS")-related information about the current location of the mobile computing device), the client application is programmed to access location information and deliver that information to the system 120.

In such a scenario, the system 120 can use the location to provide location-based information to the customer. For example, the system 120 can automatically identify the location of homes that are in proximity of the customer. By accessing information such as Multiple Listing Service ("MLS") information, the system 120 can ascertain information like option price, property type, etc.

When the customer (e.g., a potential purchaser or realtor) approaches or enters a home, such as for an open house, the system 120 can deliver mortgage loan options to the customer. The system 120 can automatically deliver mortgage options specifically tailored to that property, using listing information in combination with other customer scenario inputs. These options can be delivered through the mobile application or by email and can be delivered automatically. The customer can thereupon understand the financial products available to allow the customer to purchase the property and even have one or more products for which the customer is already approved.

Figure 3:
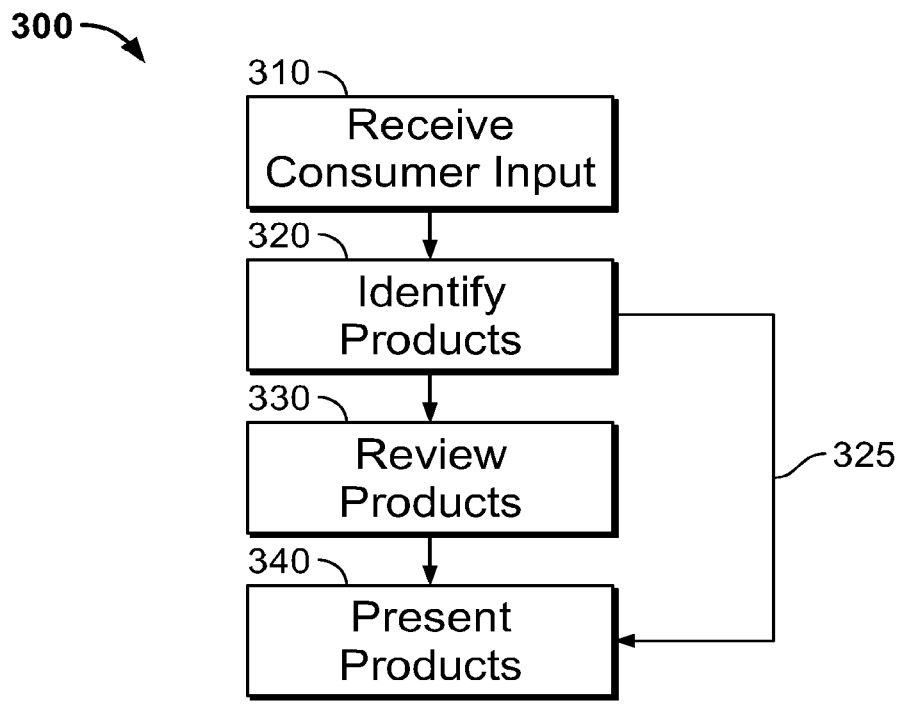
FIG. 3 shows an example method for providing financial product recommendations.

FIG. 3 illustrates an example method 300 for identifying possibly relevant financial products. The example method 300 includes receiving customer input (operation 310), identifying products (operation 320), reviewing products (operation 330), and presenting products (operation 340). Typically, financial system 120, shown in FIGS. 1-2, executes the operations of example method 300. FIGS. 4-17 provide additional details about the example method and are discussed concurrently below. Other embodiments can include more or fewer operations.

Initially, at operation 310, customer input is received relating to the desired financial product. This input can include, as described above, inquiry type 402, value 406, location 408, and other data. Example inquiry types 402 are shown in FIGS. 4A-4D. In this example, the inquiry types 402 include: buy a property, refinance a mortgage, improve a property, and use funds from a property. Each inquiry type can include one or more sub-types 404.

Figure 4A:
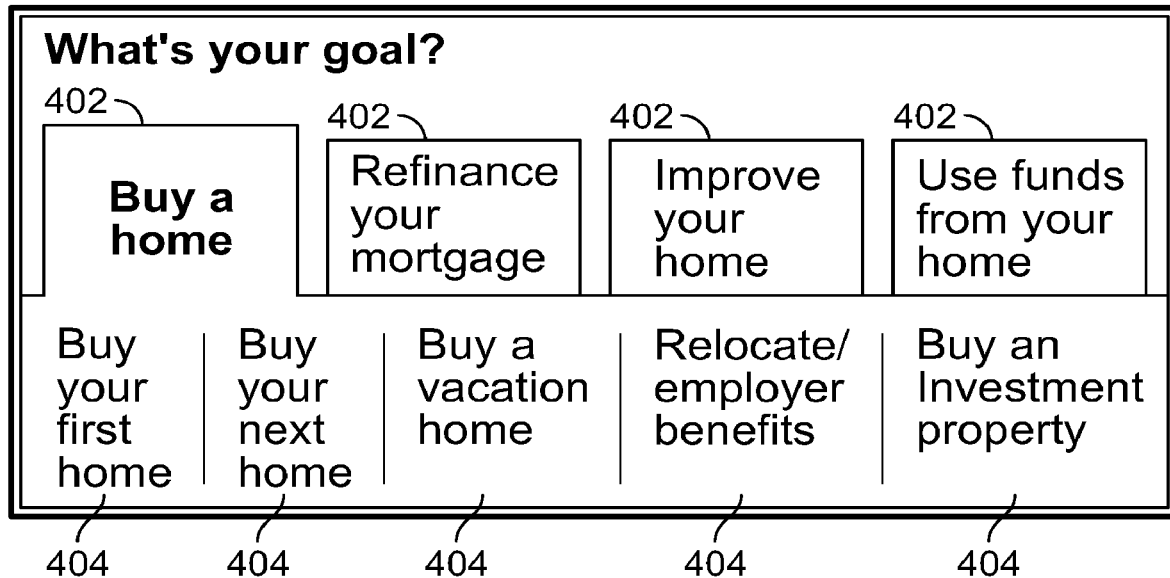
FIGS. 4A-4D show example interfaces provided during the method of FIG. 3.

As shown in FIG. 4A, example sub-types 404 of buy a property include: buy a first home, buy a next home, buy a vacation home, relocate, and buy investment property.

Figure 4B:
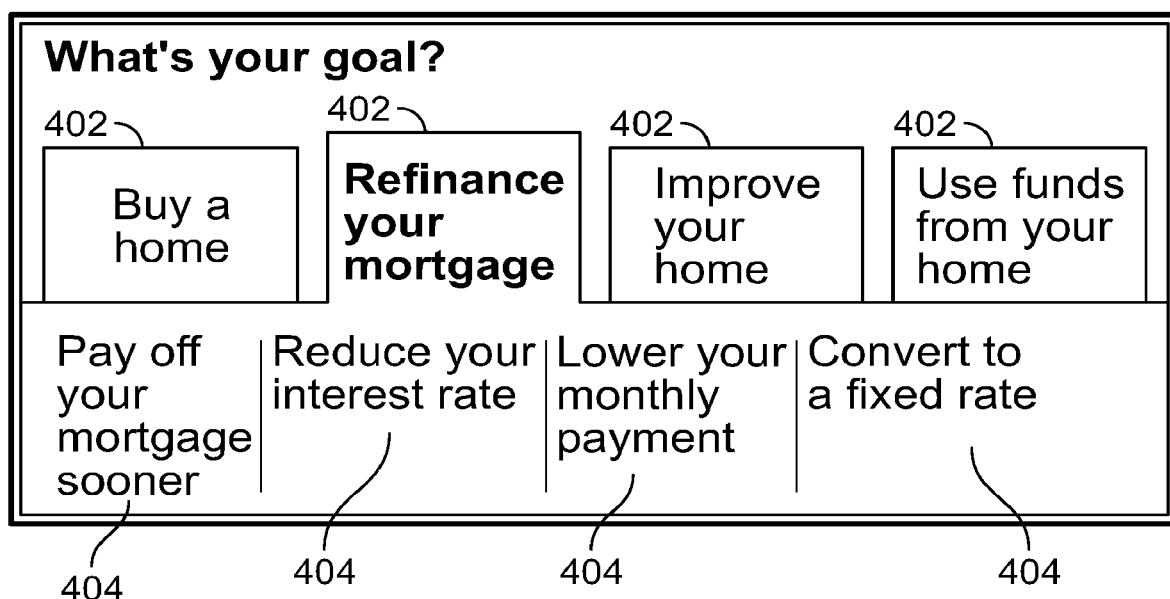

As shown in FIG. 4B, example sub-types 404 of refinance a mortgage include: pay off a mortgage sooner, reduce an interest rate, lower a monthly payment, and convert to a fixed rate.

Figure 4C:
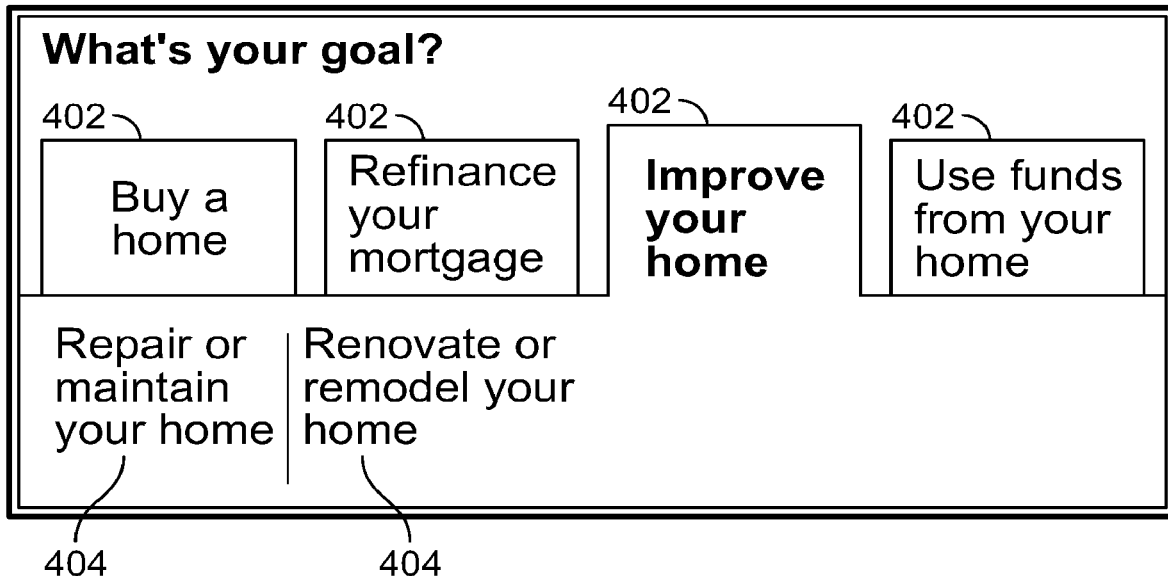

As shown in FIG. 4C, example sub-types 404 of improve a property include: repair a property and renovate a property.

Figure 4D:
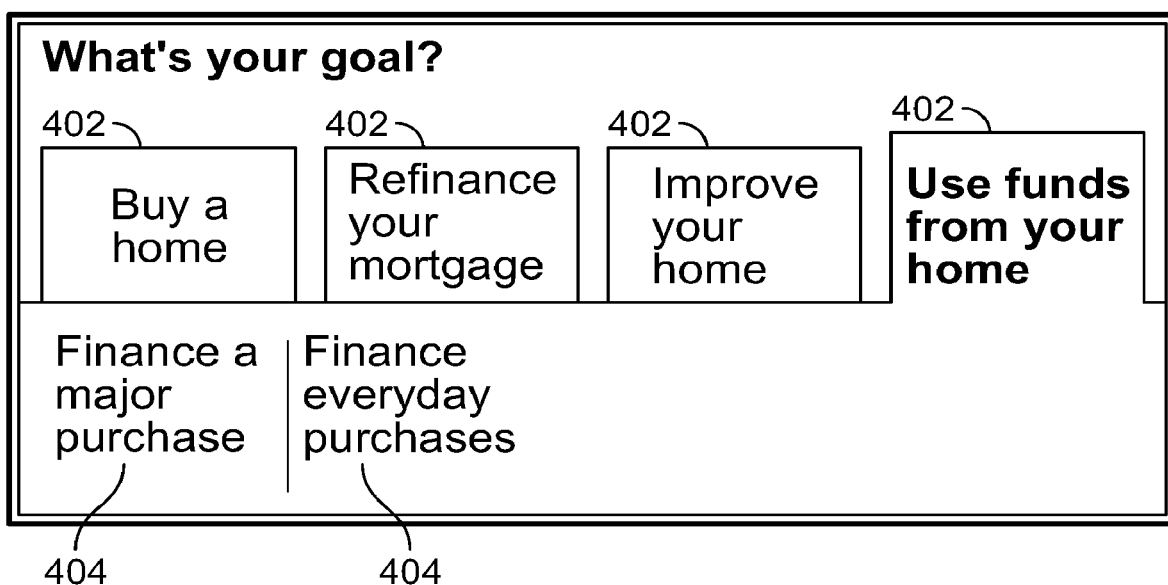

As shown in FIG. 4D, example sub-types 404 of use funds from a property include finance a major purchase and finance everyday purchases.

FIGS. 5-8 show example values 406 provided by the customer. Value 406 generally includes one or more parameters specific to a property. As shown in FIG. 5, value 406 includes a loan purpose (e.g., purchase, refinance, home equity), home value, down payment, and property location.

As shown in FIG. 6, value 406 includes home value, down payment, annual homeowner's insurance, anticipated annual property taxes, and property location.

As shown in FIG. 7, value 406 includes value of the home, existing mortgage balance, total current monthly payment, current interest rate, annual homeowner's insurance, anticipated annual property taxes, and property location. Additionally, value 406 may be pre-filled 410 in a process described below with reference to operations 502, 504 and 506.

As shown in FIG. 8, value 406 includes additional funding the customer is requesting, value of the home, existing mortgage balance, total current monthly payment, current interest rate, annual homeowner's insurance, anticipated annual property taxes, and property location. Additionally, value 406 may be pre-filled 410 in a process described below with reference to operations 502, 504 and 506.

The value can also include a credit score. By default, the system uses a standard credit score for the customer. Example standard credit scores include 680, 690, 700, 710, 720, 730, 740, 750, between 680-750, between 700-740, and between 710-730. Generally, the credit score is used to determine an interest rate and/or financial products for which the customer may qualify.

Optionally, the value includes a credit score specific to the customer. In some instances, the credit score is received from the customer. The credit score may be a range, such as 750-780. Alternatively, the credit score may be specific, such as 775. When determining interest rates and/or financial products, the system may genericize the specific credit score to a range. For example, a credit score of 751 received from the customer could be genericized by the system to return interest rates and/or financial products for a customer having a credit score in the range of 750-780.

In other instances, the system automatically pulls the credit score upon the user logging in. For example, the system can access one specific credit agency, such as Experian, to obtain the customer's credit score. As another example, the system pulls multiple credit scores from different credit agencies. Optionally, those credit scores are averaged and the average is used to return interest rates and/or financial products for the customer.

The location 408 includes a state in which the property resides. Optionally, the location 408 additionally includes a county and/or a city in which the property resides.

Other data received from the customer can include a loan duration, such as 3, 5, 7 15, or 30 years. More specifically, the loan duration can include a term for fixed-rate mortgages or adjustable-rate mortgages.

Additionally, other data can include one or more customer preferences. For example, other data can include a preference for a loan with the lowest monthly payment, a reduced number of payments, or the lowest out-of-pocket expenses. Further, other data can include a request for military financing or that the customer prefers payments that remain the same over time. With respect to refinancing, other data can include a request to pay off an existing mortgage sooner, reducing an interest rate of a mortgage, lowering an existing monthly payment, and converting an existing adjustable-rate mortgage to a fixed rate mortgage.

Additionally, other data can include a property type. For example, property type includes single family, single family detached, condominium, apartment, etc. Property type can also include a primary purpose of the property, such as owner-occupied, vacation, and investment. Still further, property type can include an intended length of ownership and discount points.

Figure 9:
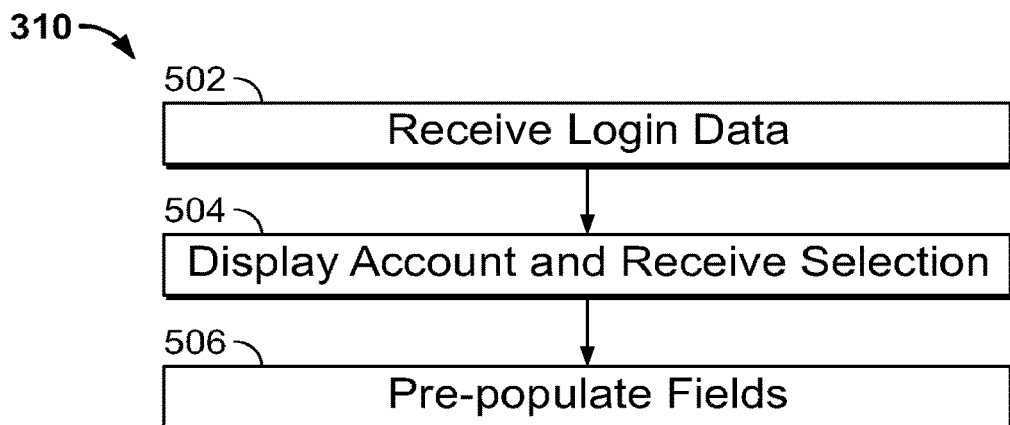
FIG. 9 shows an example method for further receiving customer input identified in FIG. 3.
Figure 10:
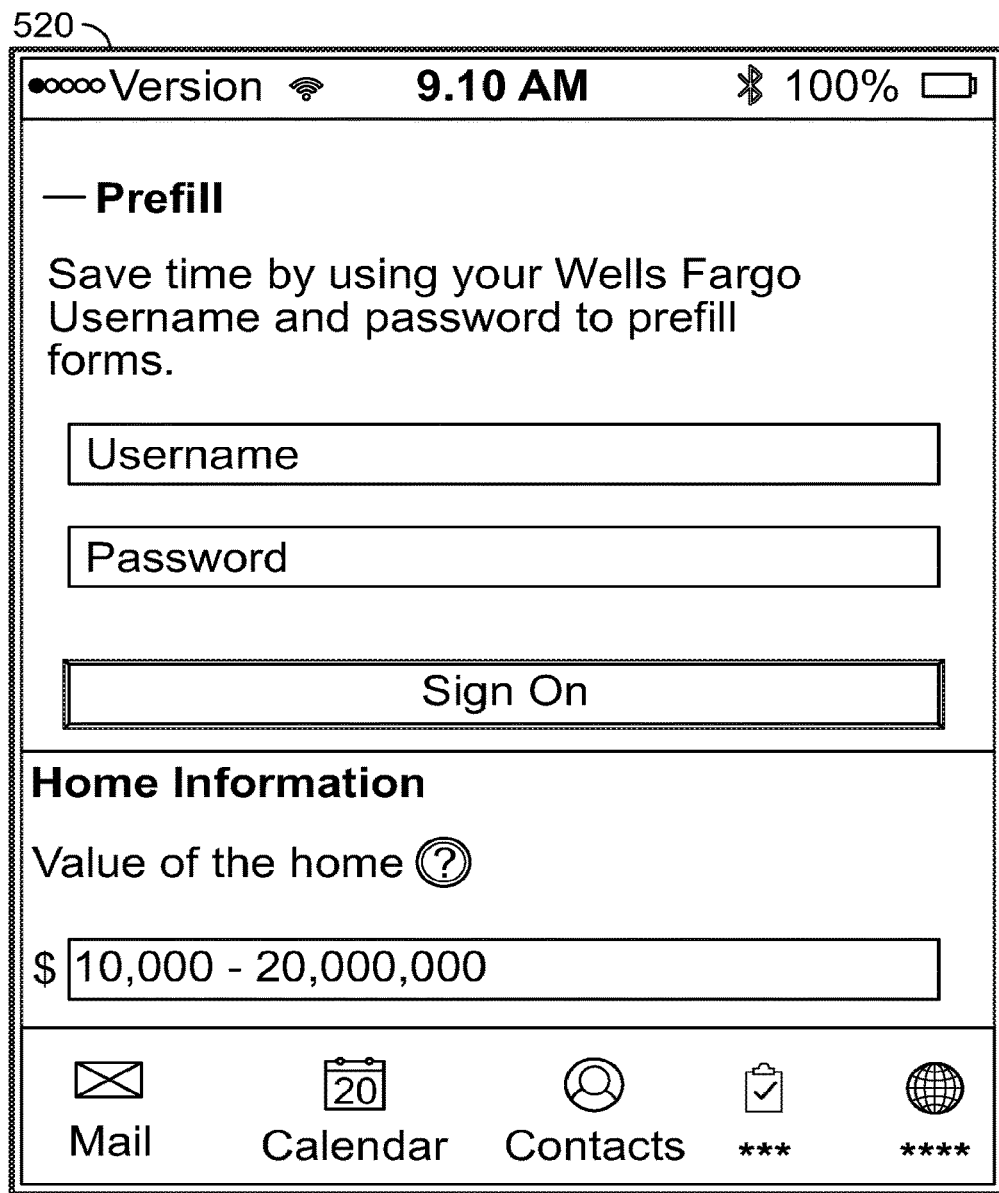
FIG. 10 shows an example interface shown during receiving customer input identified in FIG. 9.

As shown in FIG. 9, receiving customer input (operation 310) can additionally include receiving login data (operation 502), receiving an account selection (operation 504), and pre-populating fields (operation 506).

In some instances, the customer has one or more accounts associated with the financial institution, such as a checking account, a savings account, a loan, and/or a mortgage. These accounts may be consolidated and associated with a login having a username and password. During operation 502, the user's login and password are received and verified via an example interface 520, shown in FIG. 10.

If the username and password are verified, then one or more accounts are presented to the user (operation 504). Typically, loan and mortgage accounts are the types of accounts relevant to the financial product inquiry and presented to the user. Other types of accounts, such as savings and checking, are not as relevant and usually not presented to the customer.

An example interface 530 presenting the user with available accounts is shown in FIG. 11. The interface 530 shows mortgage and loan accounts associated with the username. Additional information can be provided for each mortgage and/or loan account, such as the balance, the current monthly payment, and/or the interest rate. Other data can be provided.

Upon receiving a selection from the user, one or more fields are pre-populated (operation 506) with information corresponding to the selected account. An example interface 540 is shown in FIG. 12. The interface 540 populates the existing mortgage balance, the total current monthly payment, and the current interest rate. Other data may be populated.

Referring again to FIG. 3, after receiving consumer input, products that meet the given criteria are identified (operation 320). Each product includes a rate, an annual percentage rate, a term, a payment amount, a loan amount, points, and closing costs. The system can identify alternative sources for funding the remainder, such as a second mortgage.

Example financial products include 30-year fixed rate with borrower-paid mortgage insurance (BPMI) and Home Opportunities, 5/1 adjustable-rate mortgage (ARM), 5/1 ARM with BPMI and Home Opportunities, 7/1 ARM, 7/1 ARM with BPMI, 30-year fixed rate, 30-year fixed rate jumbo, 7/1 ARM jumbo, line of credit with a fully amortized 7-year fixed-rate advance (FRA), line of credit, and 15-year fixed.

Next, at operation 330, these products are reviewed based on given criteria, such as loan amount, rate, fees, and estimated monthly payment. In some instances, the example method 300 skips operation 330, shown as route 325, and proceeds to present the financial products (operation 340) upon identifying the financial products (operation 320).

Finally, at operation 340, the relevant financial products are presented to the user, most likely the customer. Example product presentations are shown in FIGS. 13-15C. Optionally, the system can present an option to transmit the financial products to a financial consultant.

FIG. 13 is a table with financial products 440 including real-time interest rates and APRs for various types of loans for purchase rates and for refinance rates. Jumbo loan interest rates and APRs are also shown.

FIG. 14A shows example financial products 440 including details. The financial products shown in FIG. 14A were in response to a request for purchasing a $300,000 property with $50,000 down in Hennepin County, Minnesota. FIG. 14B shows an example detailed view 450 of one of the financial products shown in FIG. 14A, namely, a 30-year fixed rate with BPMI. Other financial products shown in FIG. 14A have similarly configured detailed views as that shown in FIG. 14B.

Figure 15B:
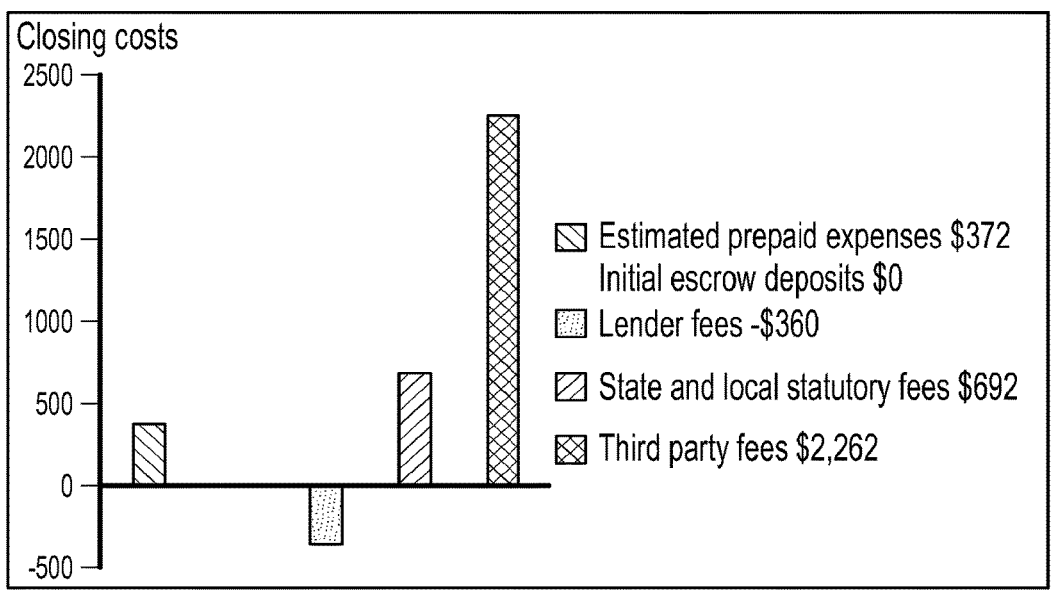

FIG. 15A shows example financial products 440 including details. In this instance, each financial product includes a rate, APR, term, payment, loan amount, points, and closing costs. When presenting the financial products, one or more may be flagged as having the lowest monthly payment, the lowest initial principal, the lowest interest payment, and/or the lowest out-of-pocket expenses. FIGS. 15B-15C show an example detailed view 450 of one of the financial products shown in FIG. 15A, with the detailed view 450 carried over from FIG. 15A to 15B.

Figure 16:
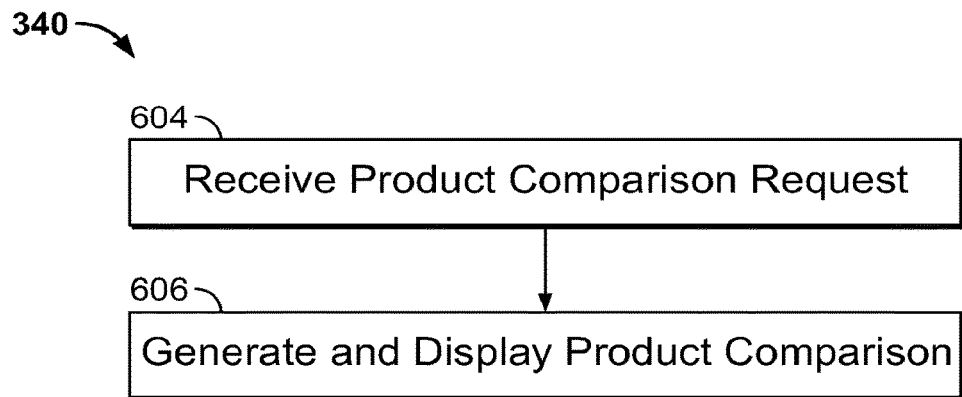
FIG. 16 shows an example method for further presenting products identified in FIG. 3.

FIG. 16 provides additional information regarding optional steps included in operation 340. These include receiving a product comparison request (operation 604) and generating and displaying a product comparison (operation 606).

After presenting the customer with the relevant financial products, the system can receive a product comparison request (operation 604). Here, the user has selected, typically, two or three different financial products for comparison, although more may be selected in other instances.

A product comparison is then displayed (operation 606). The product comparison is a graphic, such as a bar chart, pie chart, scatter plot, line plot, or other. Also, the product comparison may be a series of displays showing a comparison of, for example, payments, interest rate, and closing costs.

Figure 17:
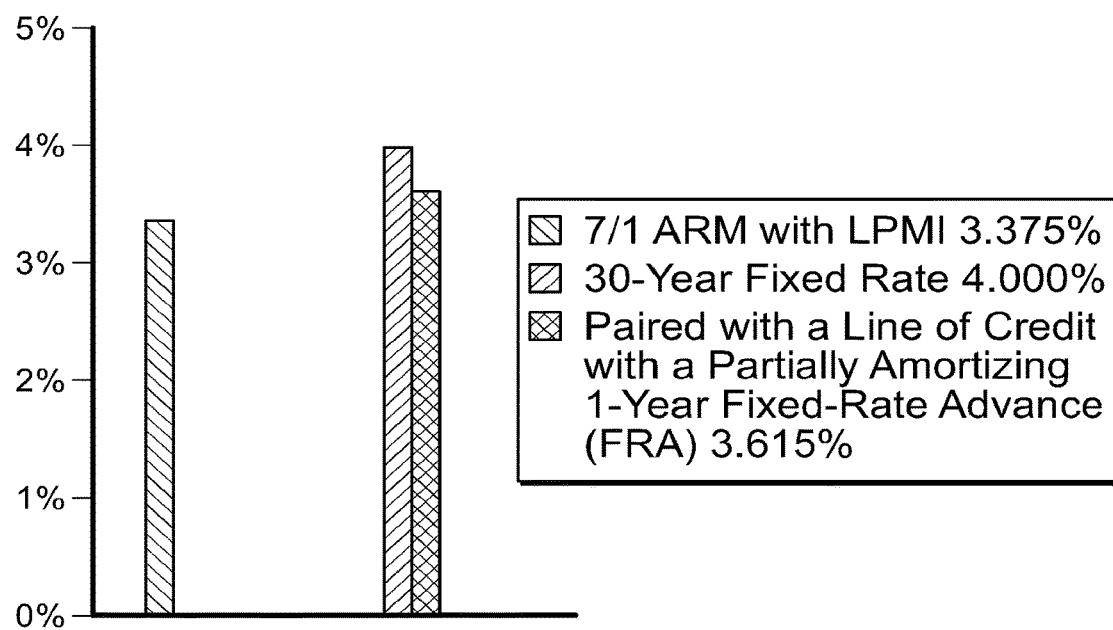
FIG. 17 shows an example report shown during presenting products identified during the method shown in FIG. 16.

In some instances, a combination product is suggested, such as a 30-year fixed rate paired with a line of credit with a partially amortizing 1-year fixed-rate advance (FRA). An example comparison 620 of the interest rate for two financial products is shown in FIG. 17. There, the product comparison can display the selected financial product as well as the suggested combination product.

Figure 18:
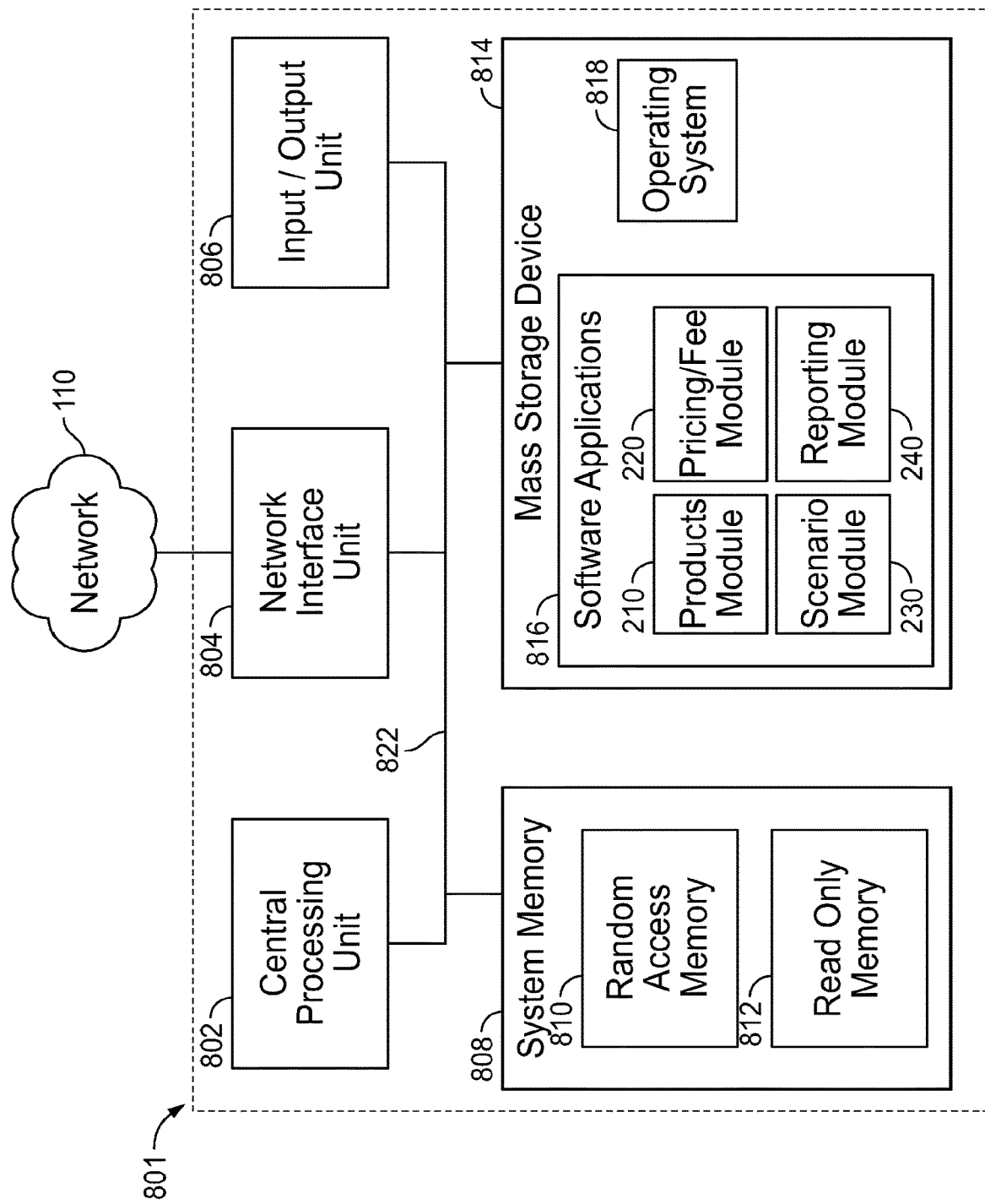
FIG. 18 shows example physical components of a computing device hosting the modules of the financial system of FIGS. 1 and 2.

FIG. 18 shows an example computing device 801 hosting software applications 816 including products and policies module 210, pricing/fee module 220, scenario module 230, and reporting module 240. As illustrated, the example computing device 801 includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the example computing device 801, such as during startup, is stored in the ROM 812. The example computing device 801 further includes a mass storage device 814. The mass storage device 814 is able to store software instructions and data.

The mass storage device 814 is connected to the CPU 802 through a mass storage controller (not shown) connected to the system bus 822. The mass storage device 814 and its associated computer-readable data storage media provide non-volatile, non-transitory storage for the example computing device 801. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the example computing device 801.

According to various embodiments of the invention, the example computing device 801 may operate in a networked environment using logical connections to remote network devices through the network 103, such as a wireless network, the Internet, or another type of network. The example computing device 801 may connect to the network 110 through a network interface unit 804 connected to the system bus 822. It should be appreciated that the network interface unit 804 may also be utilized to connect to other types of networks and remote computing systems. The example computing device 801 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the example computing device 801 can store software instructions and data. The software instructions include an operating system 818 suitable for controlling the operation of the example computing device 801. The mass storage device 814 and/or the RAM 810 also store software instructions, that when executed by the CPU 802, cause the example computing device 801 to provide the functionality of the example computing device 801 discussed in this document. For example, the mass storage device 814 and/or the RAM 810 can store software instructions that, when executed by the CPU 802, cause the example computing device 801 to display received data on the display screen of the example computing device 801.

Although various embodiments are described herein, those of ordinary skill in the art will understand that many modifications may be made thereto within the scope of the present disclosure. Accordingly, it is not intended that the scope of the disclosure in any way be limited by the examples provided.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A computing device, comprising:
   a processing unit; and
   system memory, the system memory including instructions that, when executed by the processing unit, cause the computing device to:
   responsive to authentication of a customer, provide a financial accounts interface for display at the computing device, with the financial accounts interface including financial accounts associated with the customer, wherein the financial accounts interface includes a plurality of first fields listing information about each of the financial accounts, and wherein the financial accounts interface includes a first control for each of the financial accounts that is programmed to allow for selection of a financial account of the financial accounts;
   receive, at the first control on the financial accounts interface on display at the computing device, selection of the financial account from the financial accounts;
   responsive to selection of the financial account, provide a financial products interface for display at the computing device, with the financial products interface including financial products available to the customer, wherein the financial products interface includes a plurality of second fields listing information about each of the financial products, including current pricing information for the financial products based upon financial information associated with the customer from the financial account, wherein the financial products interface includes a second control for each of the financial products that is programmed to allow for selection of the financial products for comparison;
   receive, at the second control on the financial products interface on display at the computing device, a comparison request from the customer including at least two selected products of the financial products on the financial products interface; and
   responsive to receipt of the comparison request, provide a comparison interface for display at the computing device, the comparison interface including:
      a representation that compares the at least two selected products, wherein the representation includes a graphical depiction of an aspect of the at least two selected products; and
      a recommendation of one of the at least two selected products based upon the financial information from the financial account.

2. The computing device of claim 1, wherein the financial account is a checking account, a savings account, a loan, or a mortgage.

3. The computing device of claim 1, wherein the financial accounts interface is programmed to include a balance, a payment amount, and an interest rate associated with one of the financial accounts included on the financial accounts interface.

4. The computing device of claim 1, wherein the current pricing information includes interest rates.

5. The computing device of claim 4, wherein the current pricing information also includes origination fees and title fees.

6. The computing device of claim 1, wherein the financial information includes a value of a property owned by the customer, a location of the property, and a loan amount for the property.

7. The computing device of claim 1, wherein the representation of the comparison interface includes an interest rate and a payment amount for each of the at least two selected products.

8. The computing device of claim 1, wherein the representation of the comparison interface includes a table listing each of the at least two selected products and terms associated with each of the at least two selected products.

9. The computing device of claim 1, wherein the representation of the comparison interface includes a graph associated with one of the at least two selected products.

10. The computing device of claim 1, wherein the system memory includes further instructions that, when executed by the processing unit, cause the computing device to provide an inquiry interface for display at the computing device, with the inquiry interface including a list of types of the financial products available to the customer.

11. A computer-implemented method for selecting financial products, the computer-implemented method comprising:
   responsive to authentication of a customer, providing a financial accounts interface for display at a computing device, with the financial accounts interface including financial accounts associated with the customer, wherein the financial accounts interface includes a plurality of first fields listing information about each of the financial accounts, and wherein the financial accounts interface includes a first control for each of the financial accounts that is programmed to allow for selection of a financial account of the financial accounts;

receiving, at the first control on the financial accounts interface on display at the computing device, selection of the financial account from the financial accounts;

responsive to selection of the financial account, providing a financial products interface for display at the computing device, with the financial products interface including the financial products available to the customer, wherein the financial products interface includes a plurality of second fields listing information about each of the financial products, including current pricing information for the financial products based upon financial information associated with the customer from the financial account, wherein the financial products interface includes a second control for each of the financial products that is programmed to allow for selection of the financial products for comparison;

receiving, at the second control on the financial products interface on display at the computing device, a comparison request from the customer including at least two selected products of the financial products on the financial products interface; and responsive to receipt of the comparison request, provide a comparison interface for display at the computing device, the comparison interface including:
 a representation that compares the at least two selected products, wherein the representation includes a graphical depiction of an aspect of the at least two selected products; and
 a recommendation of one of the at least two selected products based upon the financial information from the financial account.

12. The computer-implemented method of claim 11, wherein the financial account is a checking account, a savings account, a loan, or a mortgage.

13. The computer-implemented method of claim 11, wherein the financial accounts interface is programmed to include a balance, a payment amount, and an interest rate associated with one of the financial accounts included on the financial accounts interface.

14. The computer-implemented method of claim 11, wherein the current pricing information includes interest rates.

15. The computer-implemented method of claim 14, wherein the current pricing information also includes origination fees and title fees.

16. The computer-implemented method of claim 11, wherein the financial information includes a value of a property owned by the customer, a location of the property, and a loan amount for the property.

17. The computer-implemented method of claim 11, wherein the representation of the comparison interface includes an interest rate and a payment amount for each of the at least two selected products.

18. The computer-implemented method of claim 11, wherein the representation of the comparison interface includes a table listing each of the at least two selected products and terms associated with each of the at least two selected products.

19. The computer-implemented method of claim 11, wherein the representation of the comparison interface includes a graph associated with one of the at least two selected products.

20. The computer-implemented method of claim 11, further comprising providing an inquiry interface for display at the computing device, with the inquiry interface including a list of types of the financial products available to the customer.

\* \* \* \* \*